US012808363B2

(12) United States Patent
Nagura et al.

(10) Patent No.: US 12,808,363 B2
(45) Date of Patent: Nov. 24, 2026

(54) COMPRESSOR UNIT

(71) Applicant: KABUSHIKI KAISHA KOBE SEIKO SHO (KOBE STEEL, LTD.), Kobe (JP)

(72) Inventors: Kenji Nagura, Takasago (JP); Kenji Kubo, Takasago (JP)

(73) Assignee: KOBE STEEL, LTD., Kobe (JP)

( * ) Notice: Subject to any disclaimer, the term of this patent is extended or adjusted under 35 U.S.C. 154(b) by 107 days.

(21) Appl. No.: 18/865,959

(22) PCT Filed: May 10, 2023

(86) PCT No.: PCT/JP2023/017612
§ 371 (c)(1),
(2) Date: Nov. 14, 2024

(87) PCT Pub. No.: WO2023/233953
PCT Pub. Date: Dec. 7, 2023

(65) Prior Publication Data

US 2025/0314355 A1 Oct. 9, 2025

(30) Foreign Application Priority Data

Jun. 2, 2022 (JP) ................................ 2022-090152

(51) Int. Cl.
*F04B 37/18* (2006.01)
*F04B 39/08* (2006.01)
*F04B 41/02* (2006.01)

(52) U.S. Cl.
CPC .............. *F04B 37/18* (2013.01); *F04B 39/08* (2013.01); *F04B 41/02* (2013.01);
(Continued)

(58) Field of Classification Search
CPC ............ F04B 2205/10; F04B 15/06–08; F04B 23/02–028; F04B 2205/01;
(Continued)

(56) References Cited

U.S. PATENT DOCUMENTS 3,208,621 A * 9/1965 Dawson ................ F17C 13/001 220/901
2013/0037120 A1* 2/2013 Bauer .................... F25J 1/0025 137/14
(Continued)

FOREIGN PATENT DOCUMENTS

CN 203412720 U * 1/2014
CN 203979867 U * 12/2014
(Continued)

OTHER PUBLICATIONS

International Preliminary Report On Patentability (Chapter I) and Written Opinion of the International Searching Authority issued in PCT/JP2023/017612; Notification mailed Dec. 12, 2024.

*Primary Examiner* — Thomas Fink
(74) *Attorney, Agent, or Firm* — Studebaker Brackett PLLC

(57) ABSTRACT

A compressor unit includes a compressor part including a reciprocating compressor mechanism that compresses a hydrogen gas, a cooler, a preheater, a spillback unit, adjustment means, and a control unit. A suction channel includes a first routing section that passes through the preheater and a second routing section that does not pass through the preheater. The adjustment means adjusts the flow rate of the hydrogen gas flowing through the first routing section and adjusts the flow rate of the hydrogen gas flowing through the second routing section. The control unit controls the adjustment means such that the suction temperature of the compressor part falls within a predetermined temperature range.
(Continued)

The predetermined temperature range is higher than a reference temperature based on the liquefaction temperature of air.

8 Claims, 14 Drawing Sheets

(52) U.S. Cl.
CPC ..... *F04B 2205/10* (2013.01); *F17C 2221/012* (2013.01); *F17C 2227/0157* (2013.01); *F17C 2265/037* (2013.01)

(58) Field of Classification Search
CPC .. F04B 2205/02; F04B 2207/03; F04B 41/02; F04B 37/18; F04B 37/20; F04B 39/08; F17C 2250/0631; F17C 2265/036; F17C 2260/042; F17C 2227/0306; F17C 2221/012; F17C 9/02
See application file for complete search history.

(56) References Cited

U.S. PATENT DOCUMENTS

| | | | | |
|---|---|---|---|---|
| 2015/0345846 | A1* | 12/2015 | Kopko | F25B 40/04 62/115 |
| 2018/0172345 | A1 | 6/2018 | Ikeda | |
| 2022/0178360 | A1 | 6/2022 | Ukai et al. | |

FOREIGN PATENT DOCUMENTS

| | | | | | |
|---|---|---|---|---|---|
| JP | H03-92700 | A | | 4/1991 | |
| JP | 2001-065795 | A | | 3/2001 | |
| JP | 2005-273681 | A | | 10/2005 | |
| JP | 2019-027590 | A | | 2/2019 | |
| KR | 10-2021-0050016 | A | | 5/2021 | |
| KR | 20210050016 | A | * | 5/2021 | F17C 9/02 |
| KR | 102384712 | B1 | * | 4/2022 | F17C 9/02 |

* cited by examiner

COMPRESSOR UNIT

TECHNICAL FIELD

The present invention relates to a compressor unit.

BACKGROUND ART

Conventionally, low-temperature boil-off gas (BOG) such as liquefied natural gas (LNG) and liquid hydrogen (LH2) is recovered by a compressor and supplied to demand destinations such as engines. In particular, the boil-off gas generated from LH2 has a very low temperature. Therefore, if a configuration is adopted in which the compressor directly suctions in the boil-off gas, restrictions will be imposed, such as it is necessary to select materials suitable for extremely low temperatures, adopt design conditions that take into account the amount of thermal deformation, and implement strict heat insulation treatment.

In that connection, the following problem has been pointed out in Patent Literature 1 below. "In recent years, hydrogen has been attracting attention as a new energy source. When hydrogen is used as an energy source, it is assumed that hydrogen will be stored and transported in a liquefied state, like natural gas. However, hydrogen has the property that the liquefaction temperature is lower than the liquefaction temperature of air. Therefore, if facilities such as reciprocating compressors for natural gas and other gases are applied to hydrogen as is, there is a possibility of a trouble caused by cryogenic liquid hydrogen. For example, this may generate liquefied air around the apparatus that is supplied with liquid hydrogen."

That is, in Patent Literature 1, the problem of preventing troubles caused by cryogenic liquid hydrogen is studied. In an apparatus supplied with a cryogenic fluid, pipes that are easy to install high-performance heat insulation (for example, those with a vacuum area) may be employed. However, there is also a problem that high-performance insulation can be very difficult to install in some apparatuses, such as a machine that vibrates during operation and equipment that requires regular maintenance through inspection openings (such as reciprocating compressors, for example).

As disclosed in Patent Literatures 2 to 4 below, it is known to provide a heat exchanger capable of heating a boil-off gas before being suctioned into a compressor. Meanwhile, if the suctioned gas is heated excessively, the expansion of the gas volume increases the compression power and results in a loss of power (energy). Therefore, it is required to control the suction temperature within an appropriate range.

In the compressor unit disclosed in Patent Literature 2 below, as shown in FIG. 12, a heat exchanger 104 is provided that heats a boil-off gas before being suctioned into a compressor part 102 with the boil-off gas discharged from the compressor part 102. This compressor unit can change the flow rate that flows through the heat exchanger 104 depending on the gas processing volume. However, due to the configuration in which the entire amount of the boil-off gas derived from a tank 100 flows into the heat exchanger 104, the flow rate can only be changed in the heat exchanger 104 depending on the gas processing volume in the compressor part 102. Therefore, it is not possible to adjust the flow rate flowing through the heat exchanger 104 such that the gas temperature suctioned into the compressor part 102 becomes a predetermined temperature.

In contrast, the compressor unit disclosed in Patent Literature 3 below is provided with a bypass pipe 114 that bypasses the heat exchanger 112, as shown in FIG. 13. By controlling the opening of a valve 114*a* provided in this bypass pipe 114, it is possible to adjust the amount of gas passing through the heat exchanger 112. Therefore, by controlling the opening of the valve 114*a*, it may be possible to adjust the temperature of the boil-off gas suctioned into the compressor part 116. However, in the compressor unit of Patent Literature 3, even if the valve 114*a* is fully open, the boil-off gas may flow into the heat exchanger 112 due to pressure loss in the valve 114*a* itself. Therefore, it is difficult to control the gas temperature suctioned into the compressor part 116 so as to fall within an appropriate range.

Note that Patent Literature 4 below also shows, as shown in FIG. 14, a heat exchanger 123 that exchanges heat between the boil-off gas before being suctioned into the compressor part 121 and the boil-off gas after being discharged from the compressor part 121. However, this heat exchanger 123 is for re-liquefying the boil-off gas after being compressed in the compressor part 121. Therefore, the boil-off gas cooled by a cooler 125 disposed downstream of the compressor part 121 is introduced into the heat exchanger 123. Therefore, Patent Literature 4 is disadvantageous in terms of sufficiently heating the evaporated gas suctioned into the compressor part 121. Moreover, in Patent Literature 4, as in Patent Literature 3, since the temperature of the gas suctioned into the compressor part 121 is unlikely to become too high, there is no consideration to adjusting the temperature of the boil-off gas suctioned into the compressor part 121.

CITATION LIST

Patent Literature

Patent Literature 1: JP 2020-172870 A
Patent Literature 2: JP 2001-65795 A
Patent Literature 3: JP H03-92700 A
Patent Literature 4: JP 2019-27590 A

SUMMARY OF INVENTION

An object of the present invention is to properly manage the temperature of the hydrogen gas that is a boil-off gas suctioned into a reciprocating compressor part in a compressor unit.

A compressor unit according to one aspect of the present invention is a compressor unit for recovering a hydrogen gas that is a boil-off gas from a liquid hydrogen storage tank, and supplying at least part of the hydrogen gas to a demand destination including at least one of an engine, a power generation facility, or a boiler. The compressor unit includes: a compressor part including a reciprocating compressor mechanism configured to compress the hydrogen gas flowing through a suction channel and discharges the compressed hydrogen gas into a discharge channel; a water-cooled or air-cooled cooler for cooling the hydrogen gas discharged into the discharge channel; a preheater configured to exchange heat between the hydrogen gas before being suctioned into the compressor part, and the hydrogen gas after being discharged from the compressor part and flowing toward the cooler; and a spillback unit including a spillback channel for returning the hydrogen gas discharged from the compressor part to a part downstream or upstream of the preheater in the suction channel. The discharge channel or the suction channel includes a first routing section and a second routing section that split into two branches along a flow direction of the hydrogen gas and then merge with each other. The first routing section passes through the preheater while the second routing section does not pass through the preheater. The compressor unit further includes: adjustment means configured to adjust a flow rate of the hydrogen gas flowing through the first routing section and adjust a flow rate of the hydrogen gas flowing through the second routing section; and a control unit configured to control the adjustment means such that a suction temperature that is a temperature of the hydrogen gas suctioned into the compressor part falls within a predetermined temperature range. The predetermined temperature range is higher than a reference temperature based on a liquefaction temperature of air.

DESCRIPTION OF EMBODIMENTS

Embodiments will be described below with reference to the accompanying drawings.

First Embodiment

A compressor unit according to the present embodiment is configured to recover a hydrogen gas, which is a flammable boil-off gas below 0° C., from a liquid hydrogen storage tank, compress the recovered hydrogen gas, and supply the hydrogen gas to a demand destination. The boil-off gas, which is a hydrogen gas, is at about −250° C. Examples of the demand destination include power generation equipment, boilers, and engines for ships or the like.

Figure 1:
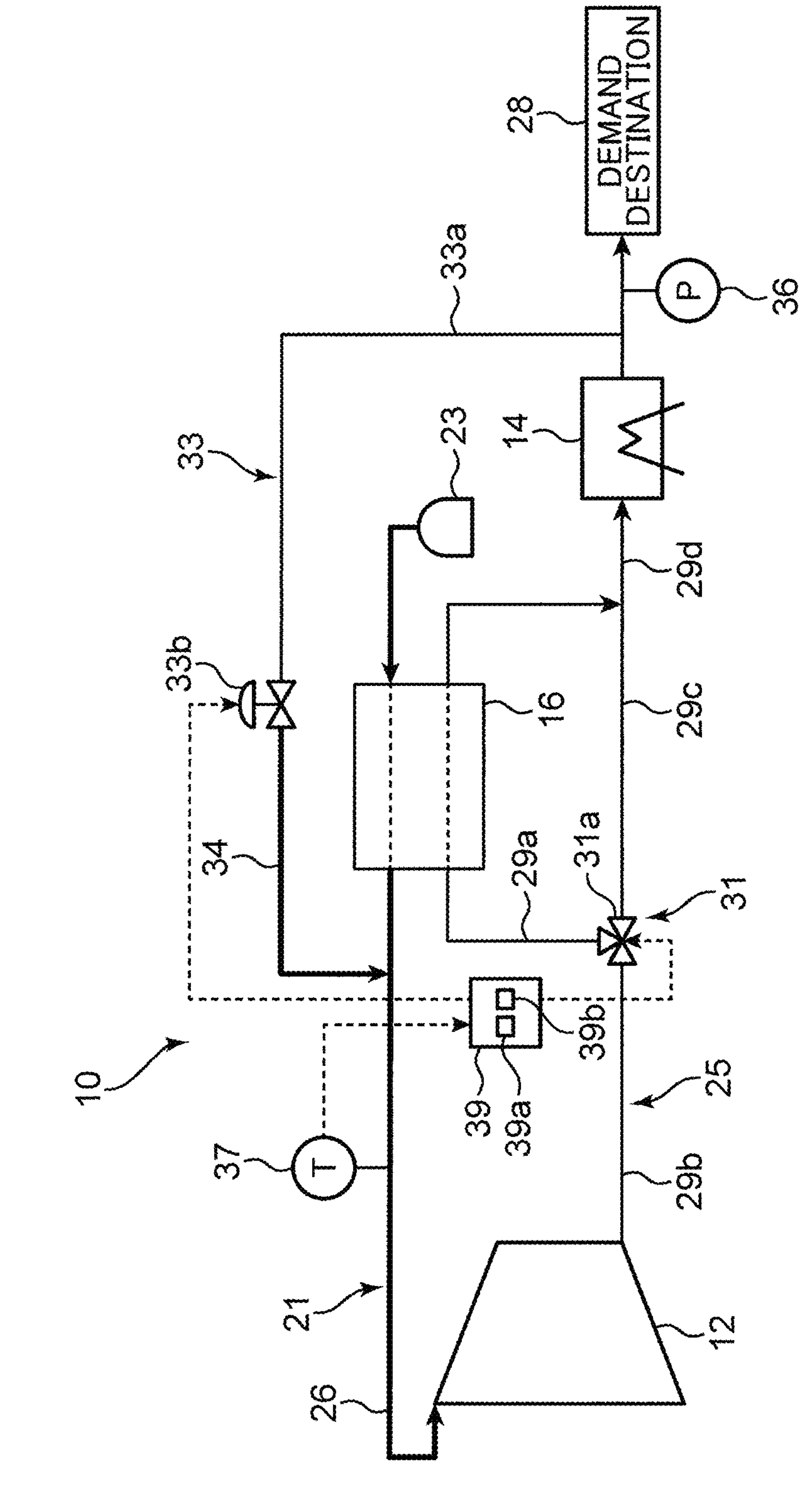
FIG. 1 is a diagram schematically showing a configuration of a compressor unit according to a first embodiment.

As shown in FIG. 1, the compressor unit 10 includes a compressor part 12 for compressing the hydrogen gas, a cooler 14 for cooling the hydrogen gas compressed by the compressor part 12, and a preheater 16 for heating the hydrogen gas before being suctioned into the compressor part 12.

Figure 2:
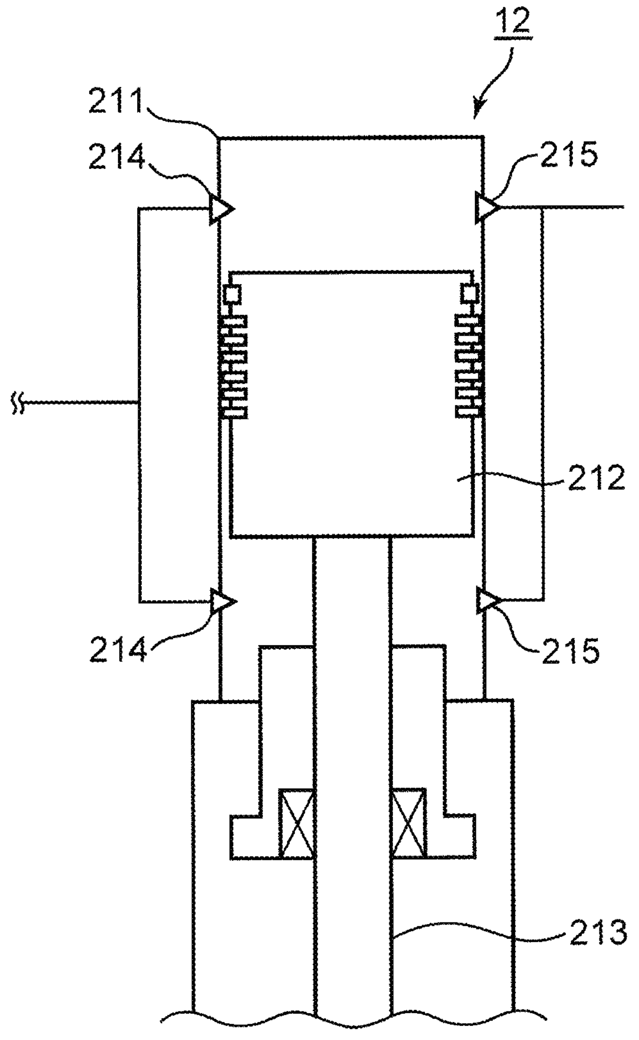
FIG. 2 is a diagram schematically showing the configuration of the compressor unit according to the first embodiment.

The compressor part 12 is connected to a liquid hydrogen storage tank 23 via a suction channel 21. Therefore, the boil-off gas that is a liquefied gas generated inside the liquid hydrogen storage tank 23 is suctioned into the compressor part 12 through the suction channel 21. The compressor part 12 is configured by a reciprocating compressor mechanism. That is, as shown in FIG. 2, the compressor part 12 includes a cylinder part 211, a piston 212, a piston rod 213, a pair of suction valves 214, and a pair of discharge valves 215. The piston 212 and the piston rod 213 are connected to a crank mechanism (not shown). By the piston 212 reciprocating inside the cylinder part 211, the hydrogen gas is compressed inside a compression chamber. FIG. 2 shows the compressor part 12 having a double acting structure, but the compressor part 12 may also have a single acting structure.

Note that for convenience, FIG. 1 shows the compressor part 12 as a single trapezoid, but the compressor part 12 does not necessarily have to be a single stage compressor, but may include multiple compression stages. That is, the compressor part 12 may be configured such that the hydrogen gas is sequentially compressed and pressurized by the pistons 212 inside multiple cylinder parts 211 connected in series. The same applies to other embodiments described later.

The suction channel 21 includes a heat insulating material 26 for suppressing heat input from the outside air. Note that the heat insulating material 26 may be omitted. In addition, a heat insulating material (not shown) may also be provided in a discharge channel 25 through which the hydrogen gas discharged from the compressor part 12 flows.

The cooler 14 is disposed on the discharge channel 25. The cooler 14 may be of a water-cooled type or an air-cooled type. The hydrogen gas cooled by the cooler 14 is sent to a demand destination 28.

The preheater 16 is configured to exchange heat between the hydrogen gas before being suctioned into the compressor part 12 and the hydrogen gas after being discharged from the compressor part 12, and to heat the hydrogen gas before being suctioned into the compressor part 12. The preheater 16 is connected to the discharge channel 25 upstream of the cooler 14. In the preheater 16, the hydrogen gas flowing through the suction channel 21 toward the compressor part 12 is heated by the hydrogen gas flowing toward the cooler 14. Therefore, unlike a configuration in which heating is performed using the hydrogen gas after being cooled by the cooler 14, the hydrogen gas can be heated effectively.

The preheater 16 is connected to a first routing section 29*a* of the discharge channel 25. That is, the discharge channel 25 includes an upstream routing section 29*b*, the first routing section 29*a* and a second routing section 29*c* that split into two branches from the upstream routing section 29*b* and then merge with each other, and a downstream routing section 29*d* through which the hydrogen gas merged from the first routing section 29*a* and the second routing section 29*c* flows. The upstream routing section 29*b* is connected to the compressor part 12. The downstream routing section 29*d* extends to the demand destination 28.

Since the first routing section 29*a* passes through the preheater 16, at least part of the hydrogen gas discharged from the compressor part 12 can flow into the preheater 16. Since the preheater 16 is also connected to the suction channel 21, the hydrogen gas flowing through the suction channel 21 can be heated by the hydrogen gas flowing through the first routing section 29*a*. Meanwhile, the second routing section 29*c* does not pass through the preheater 16.

The downstream routing section 29*d* is connected to the cooler 14. That is, in the discharge channel 25, the cooler 14 is disposed downstream of the preheater 16. Therefore, the preheater 16 heats the hydrogen gas flowing through the suction channel 21 by using the hydrogen gas before being cooled by the cooler 14.

The discharge channel 25 is provided with adjustment means 31 that adjusts the flow rate of the hydrogen gas flowing through the first routing section 29*a* and adjusts the flow rate of the hydrogen gas flowing through the second routing section 29*c*. In the example shown in FIG. 1, the adjustment means 31 includes a three-way valve 31*a* provided at the branch point of the first routing section 29*a* and the second routing section 29*c*. The three-way valve 31*a* is configured to distribute the hydrogen gas flowing through the upstream routing section 29*b* to the first routing section 29*a* and the second routing section 29*c*. Therefore, by changing the orientation or position of a valve body (not shown) of the three-way valve 31*a*, the three-way valve 31*a* is configured to be able to change the distribution ratio to the first routing section 29*a* and the second routing section 29*c* from a state in which the entire flow rate flowing through the upstream routing section 29*b* flows through the first routing section 29*a* (second routing section 29*c* side is closed) to a state in which the entire flow rate flowing through the upstream routing section 29*b* flows through the second routing section 29*c* (first routing section 29*a* side and preheater 16 side are closed).

Note that in the configuration of FIG. 1, the three-way valve 31*a* is disposed in the place where the upstream routing section 29*b*, the first routing section 29*a*, and the second routing section 29*c* are connected to each other, but alternatively, the three-way valve 31*a* may be disposed in the place where the first routing section 29*a*, the second routing section 29*c*, and the downstream routing section 29*d* are connected to each other.

Figure 3:
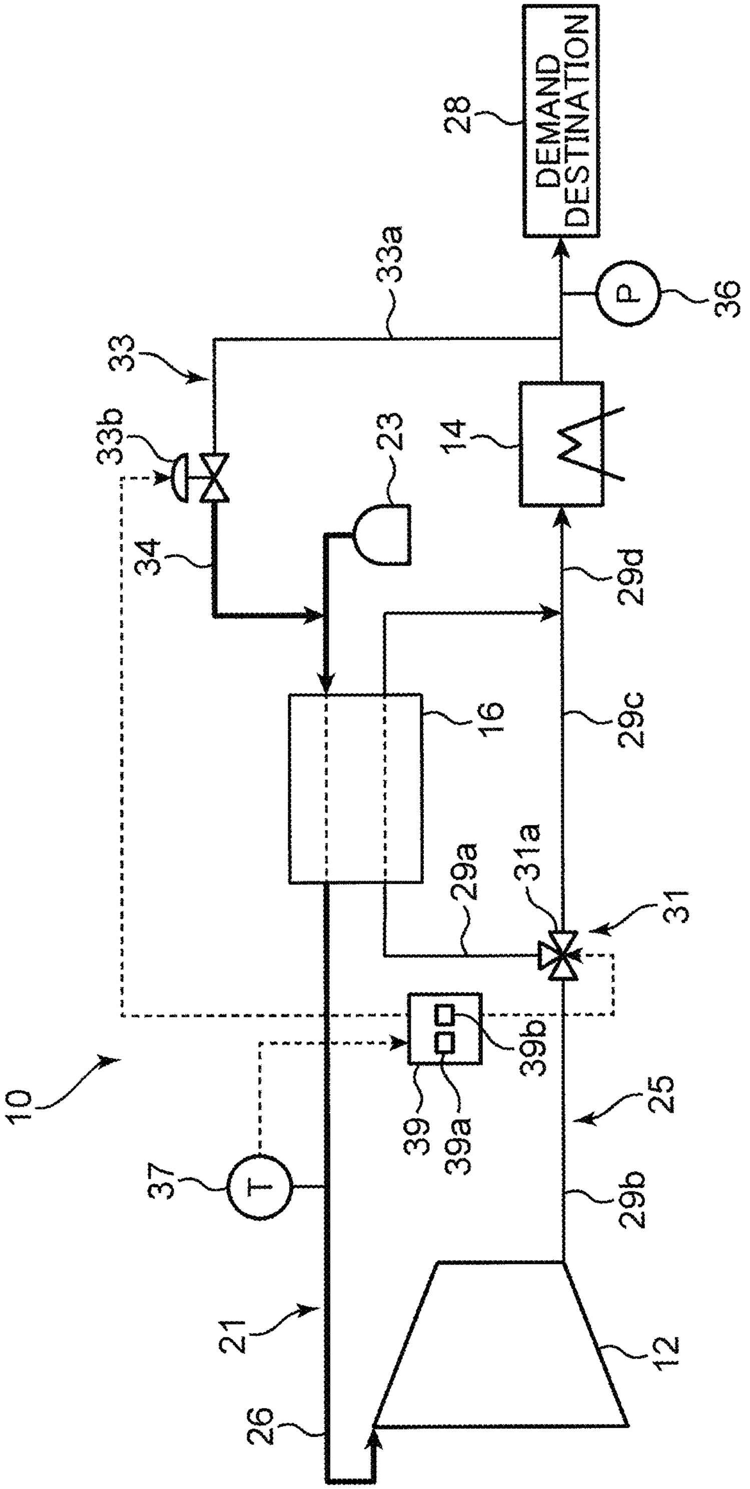
FIG. 3 is a diagram schematically showing the configuration of the compressor unit according to a variation of the first embodiment.

The compressor unit 10 is provided with a spillback unit 33 for returning the hydrogen gas discharged from the compressor part 12 to the suction channel 21. The spillback unit 33 includes a spillback channel 33*a* and a spillback valve 33*b* including a valve disposed in the spillback channel 33*a* and having an adjustable opening. One end of the spillback channel 33*a* is connected to a part downstream of the cooler 14 in the discharge channel 25, whereas the other end is connected to a part downstream of the preheater 16 in the suction channel 21. That is, the hydrogen gas flowing through the spillback channel 33*a* merges with the hydrogen gas that passes through the preheater 16 between the preheater 16 and the compressor part 12 in the suction channel 21. The downstream part of the spillback valve 33*b* in the spillback channel 33*a* is provided with a heat insulating material 34 for suppressing heat input from the outside air. However, the heat insulating material 34 can be omitted. Note that as shown in FIG. 3, the other end of the spillback channel 33*a* may be connected to a part upstream of the preheater 16 in the suction channel 21.

The discharge channel 25 is provided with a pressure sensor 36 for detecting the pressure of the hydrogen gas flowing through the discharge channel 25. The pressure sensor 36 is located downstream of the connection part where the spillback channel 33*a* connects to the discharge channel 25.

The suction channel 21 is provided with a temperature sensor 37 for detecting the temperature of the hydrogen gas flowing through the suction channel 21. The temperature sensor 37 is disposed between the compressor part 12 and the connection part where the spillback channel 33*a* is connected in the suction channel 21. Therefore, the temperature sensor 37 can acquire the temperature of the hydrogen gas after being heated by the preheater 16 (hydrogen gas after the hydrogen gas from the spillback channel 33*a* merges if the hydrogen gas flows through the spillback channel 33*a*).

The pressure sensor 36 outputs a signal indicative of the detected pressure, whereas the temperature sensor 37 outputs a signal indicative of the acquired temperature. The signal from the pressure sensor 36 and the signal from the temperature sensor 37 are input into a controller 39. The controller 39 is a computer that controls various operations of the compressor unit 10. Functions of the controller 39 executed by this computer include a control unit 39*a* and a spillback control unit 39*b*. The control unit 39*a* is a functional unit configured to control the adjustment means 31 while referring to the temperature acquired by the temperature sensor 37 as a suction temperature, which is the temperature of the hydrogen gas suctioned into the compressor part 12. The spillback control unit 39*b* is a functional unit configured to control the spillback valve 33*b* based on the detected pressure of the pressure sensor 36.

Here, the control operation by the control unit 39*a* will be described with reference to FIG. 4. The control unit 39*a* first determines whether the suction temperature (temperature T) is equal to or lower than a predetermined target temperature T1 (step ST13). Note that the target temperature T1 is set to a temperature higher than a reference temperature described later.

When the suction temperature (temperature T) is equal to or lower than the target temperature T1, the control unit 39*a* controls the adjustment means 31 to decrease the flow rate bypassing the preheater 16 and increase the flow rate flowing through the preheater 16 (step ST14). That is, the three-way valve 31*a* as the adjustment means 31 is controlled such that the opening on the second routing section 29*c* side decreases and the opening on the first routing section 29*a* side increases. This causes the amount of heat applied to the hydrogen gas flowing through the suction channel 21 to increase in the preheater 16, thereby increasing the suction temperature (temperature T).

On the other hand, when the suction temperature (temperature T) is higher than the target temperature T1, the control unit 39*a* controls the adjustment means 31 to increase the flow rate bypassing the preheater 16 and decrease the flow rate flowing through the preheater 16 (step ST15). That is, the three-way valve 31*a* as the adjustment means 31 is controlled such that the opening on the second routing section 29*c* side increases and the opening on the first routing section 29*a* side decreases. This causes the amount of heat applied to the hydrogen gas flowing through the suction channel 21 to decrease in the preheater 16, thereby decreasing the suction temperature (temperature T). That is, the control unit 39*a* controls the adjustment means 31 such that the suction temperature falls within a predetermined temperature range. The temperature range is higher than the predetermined reference temperature.

The reference temperature is set based on the liquefaction temperature of air. Specifically, the reference temperature is preferably the liquefaction temperature of air. However, if the outer surface of a member that comes into contact with the outside air in the compressor part 12 (such as cylinder part 211) becomes higher than the liquefaction temperature of air, the reference temperature can also be lower than the liquefaction temperature of air. The reference temperature may be set such that the temperature of outer surfaces of the piping and instrumentation of the suction channel 21 is higher than the liquefaction temperature of air. This prevents the air from liquefying even if the air around the compressor part 12 and the suction channel 21 is cooled by the cold heat of the hydrogen gas.

The spillback control unit 39*b* controls the spillback valve 33*b* such that the pressure detected by the pressure sensor 36 becomes a predetermined set pressure. That is, when the pressure detected by the pressure sensor 36 is higher than the set pressure, the spillback valve 33*b* is controlled to increase the opening of the spillback valve 33*b*. This causes the flow rate of the hydrogen gas returned to the suction channel 21 to increase, out of the hydrogen gas that has passed through the cooler 14, thereby decreasing the pressure of the hydrogen gas supplied to the demand destination 28. On the other hand, when the pressure detected is lower than the set pressure, the spillback valve 33*b* is controlled to decrease the opening of the spillback valve 33*b*. This causes the flow rate of the hydrogen gas returned to the suction channel 21 to decrease, out of the hydrogen gas that has passed through the cooler 14, thereby increasing the pressure of the hydrogen gas supplied to the demand destination 28. When the detected pressure agrees with the set pressure, the opening of the spillback valve 33*b* is not changed.

As described above, in the present embodiment, by using the adjustment means 31, the flow rate of the hydrogen gas that passes through the preheater 16 is adjusted, and the flow rate of the hydrogen gas that does not pass through the preheater 16 is also adjusted. Furthermore, the adjustment means 31 is controlled such that the temperature of the hydrogen gas suctioned into the compressor part 12 falls within the predetermined temperature range. Therefore, the suction temperature of the compressor part 12 can be appropriately managed. In addition, by using the heat of the hydrogen gas before flowing into the cooler 14 (discharge gas), the suction temperature can be appropriately heated. Furthermore, since the connection part where the spillback channel 33*a* is connected to the suction channel 21 is located upstream of the temperature sensor 37, even if the gas temperature detected by the temperature sensor 37 changes due to the hydrogen gas returned to the suction channel 21 by the spillback unit 33, the temperature of the hydrogen gas suctioned into the compressor part 12 can be kept within an appropriate range. Moreover, since the temperature of the hydrogen gas suctioned into the compressor part 12 can be made higher than the above-mentioned reference temperature, liquefaction of oxygen, which is a combustion supporting gas, can be avoided.

In the present embodiment, the adjustment means 31 includes the three-way valve 31*a*. Therefore, one valve can adjust the flow rate of the hydrogen gas toward the preheater 16 and also adjust the flow rate of the hydrogen gas that does not pass through the preheater 16, contributing to simplifying the configuration.

In the present embodiment, since the suction channel 21 includes the heat insulating material 26, unintended heat input in the suction channel 21 can be suppressed, thereby allowing the suction temperature to be controlled more appropriately.

Figure 5:
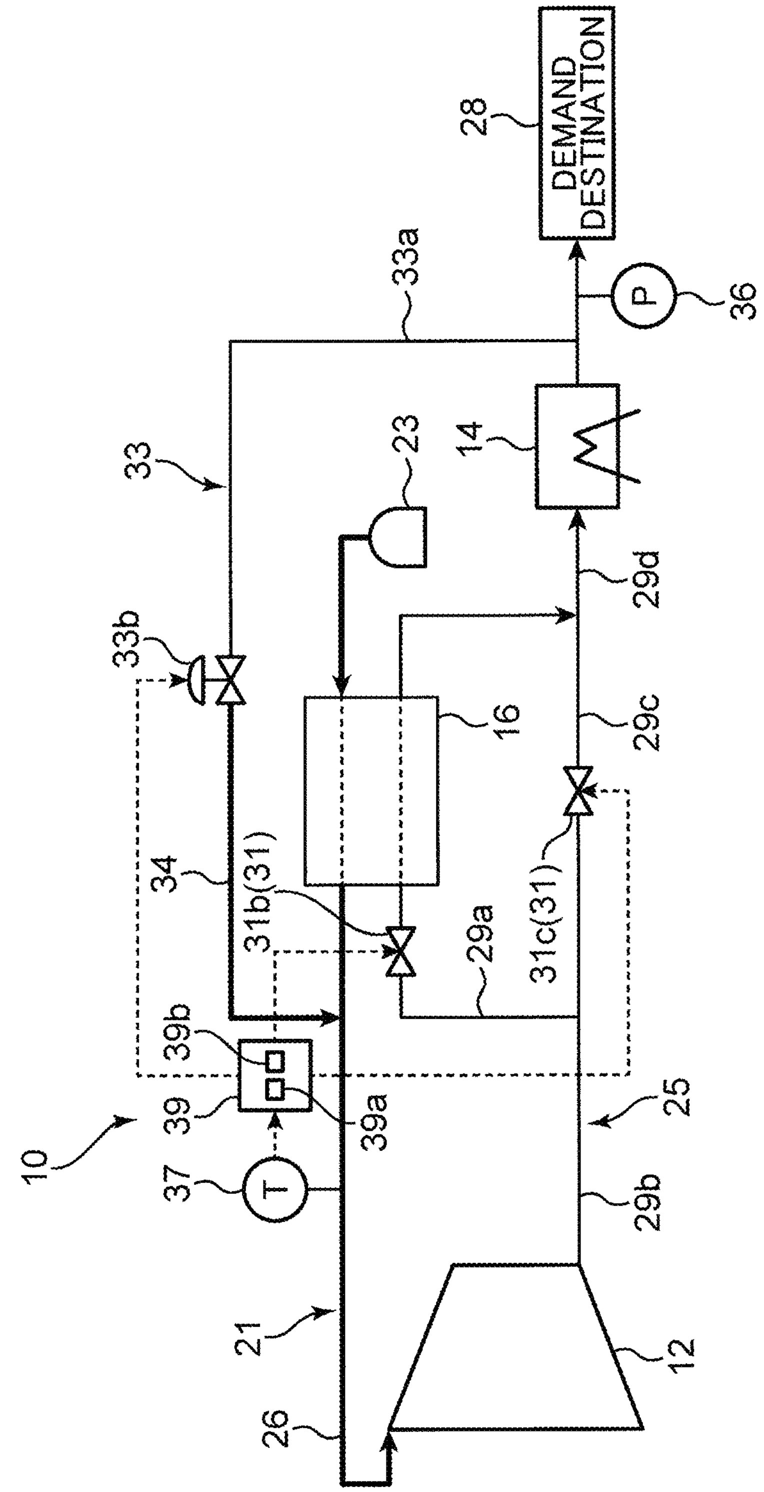
FIG. 5 is a diagram schematically showing the configuration of the compressor unit according to the variation of the first embodiment.

FIG. 1 shows an example in which the adjustment means 31 includes the three-way valve 31*a*, but the present embodiment is not limited to this example. As shown in FIG. 5, the adjustment means 31 may include a first valve 31*b* provided on the first routing section 29*a* and having an adjustable opening, and a second valve 31*c* provided on the second routing section 29*c* and having an adjustable opening.

Here, the control operation by the control unit 39*a* in the variation shown in FIG. 5 will be described with reference to FIG. 6. Note that the operation of the spillback control unit 39*b* is similar to that in the first embodiment, and the details will be omitted.

The control unit 39*a* determines whether the suction temperature (temperature T) acquired by the temperature sensor 37 is equal to or higher than a predetermined upper limit temperature T2 (step ST11). When the suction temperature (temperature T) is equal to or higher than the upper limit temperature T2, the control unit 39*a* controls the adjustment means 31 to stop the flow of the hydrogen gas through the first routing section 29*a* (step ST12). In this case, the first valve 31*b* is closed and the second valve 31*c* is fully opened. This stops the flow of the hydrogen gas discharged from the compressor part 12 into the preheater 16. Therefore, the hydrogen gas flowing through the suction channel 21 is suctioned into the compressor part 12 without being heated in the preheater 16. Therefore, the temperature of the hydrogen gas suctioned into the compressor part 12 (suction temperature) can be prevented from becoming excessively high.

Figure 4:
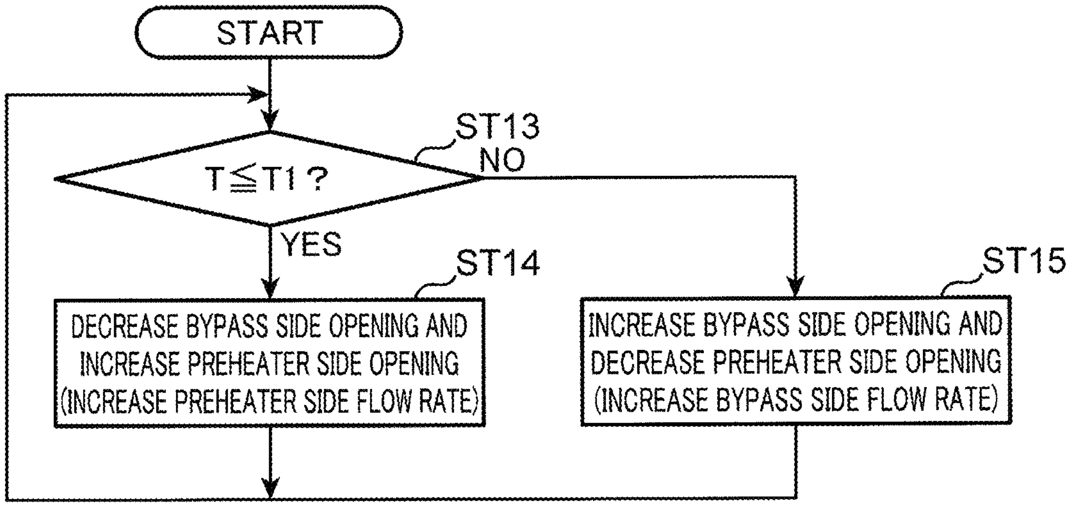
FIG. 4 is a diagram for describing a control operation of a control unit in the compressor unit according to the first embodiment.

On the other hand, when the suction temperature (temperature T) is lower than the upper limit temperature T2, as in FIG. 4, the control unit 39*a* determines whether the suction temperature (temperature T) is equal to or lower than the predetermined target temperature T1 (step ST13). At this time, since the adjustment means 31 is open to at least the first routing section 29*a* side, at least part of the hydrogen gas discharged from the compressor part 12 is introduced into the preheater 16. Note that the target temperature T1 is a temperature lower than the upper limit temperature T2.

When the suction temperature (temperature T) is equal to or lower than the target temperature T1, the control unit 39*a* controls the adjustment means 31 to decrease the flow rate bypassing the preheater 16 and increase the flow rate flowing through the preheater 16 (step ST14). That is, the second valve 31*c* is controlled such that the opening of the second valve 31*c* decreases, and the first valve 31*b* is controlled such that the opening of the first valve 31*b* increases. As a result, the gas flow rate passing through the preheater 16 out of the discharge gas increases, whereas the gas flow rate bypassing the preheater 16 decreases.

On the other hand, when the suction temperature (temperature T) is higher than the target temperature T1, the control unit 39*a* controls the adjustment means 31 to increase the flow rate bypassing the preheater 16 and decrease the flow rate flowing through the preheater 16 (step ST15). That is, the second valve 31*c* is controlled such that the opening of the second valve 31*c* increases, and the first valve 31*b* is controlled such that the opening of the first valve 31*b* decreases. As a result, the gas flow rate passing through the preheater 16 out of the discharge gas decreases, whereas the gas flow rate bypassing the preheater 16 increases. That is, the flow of the hydrogen gas discharged from the compressor part 12 into the preheater 16 is adjusted such that the suction temperature is within the predetermined temperature range.

Figure 6:
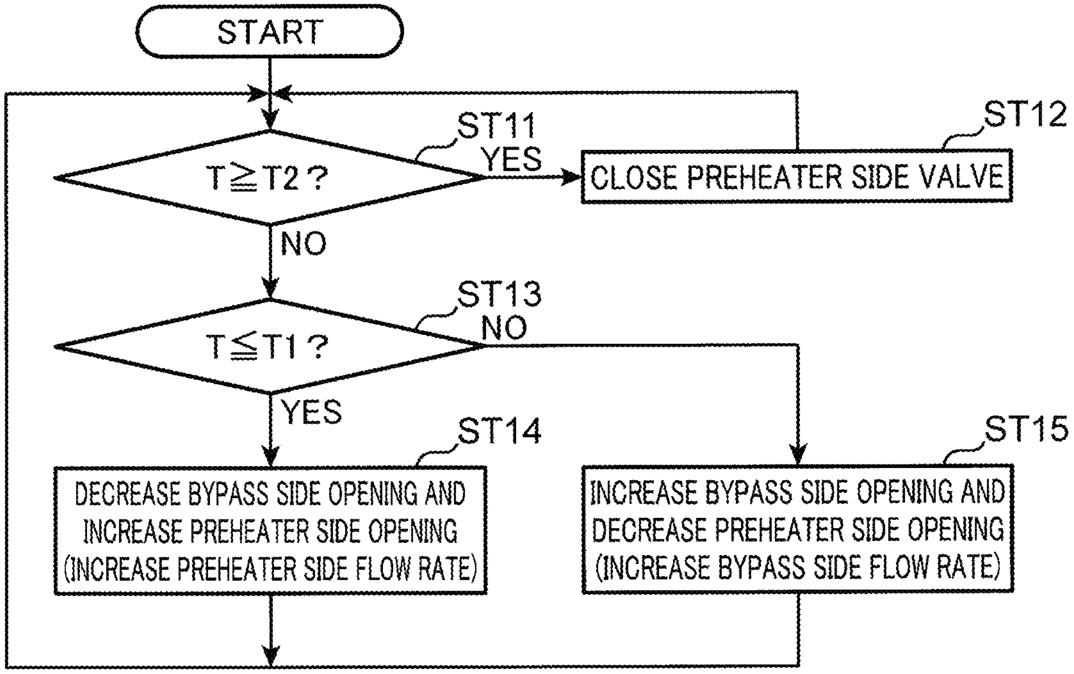
FIG. 6 is a diagram for describing the control operation of the control unit in the compressor unit according to the variation of the first embodiment.

Note that in the configuration shown in FIG. 5, the control operation by the control unit 39*a* may be performed based on FIG. 4 (that is, in FIG. 6, steps ST11 and ST12 may be omitted). In the configuration of FIG. 1, the above-mentioned steps ST11 and ST12 may be performed.

Figure 7:
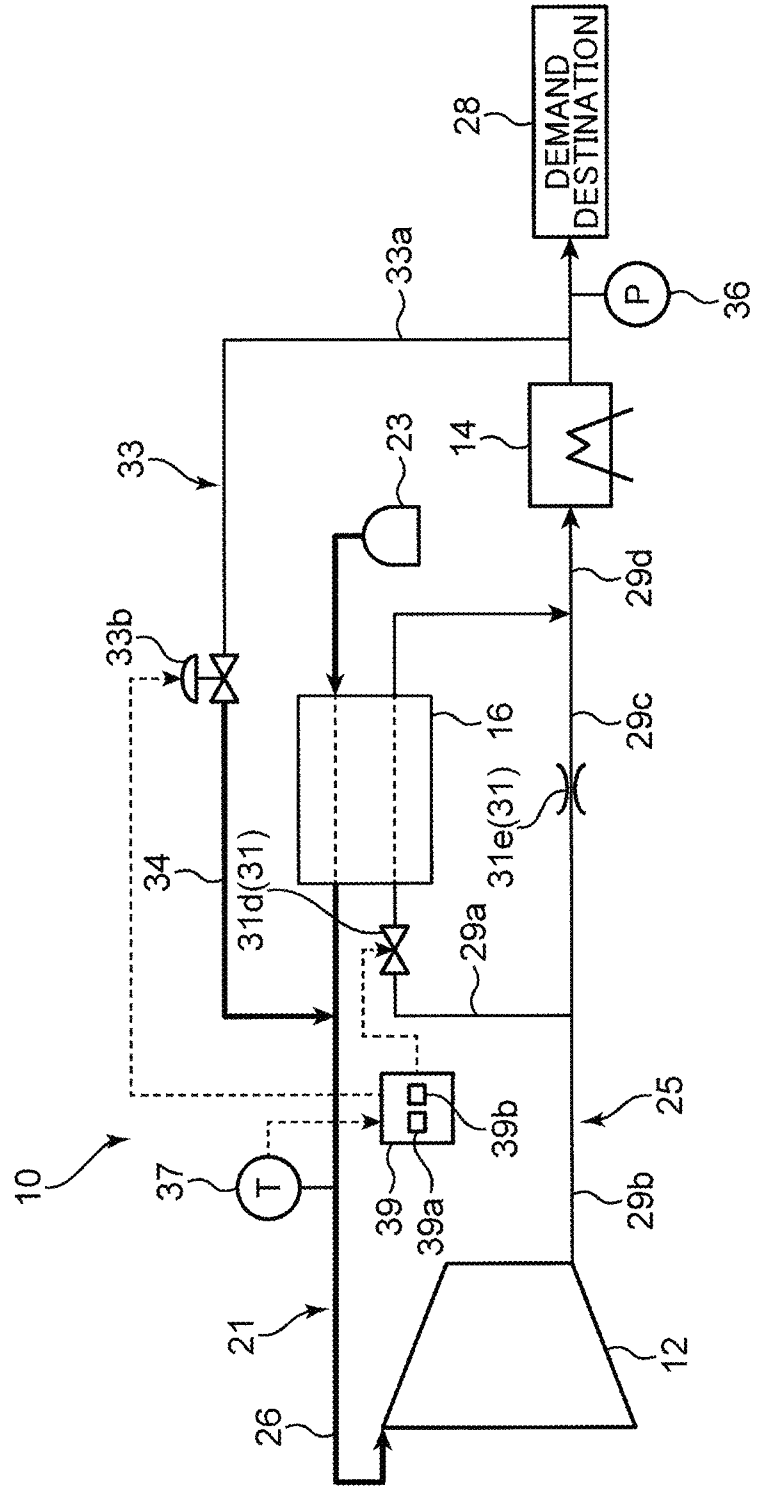
FIG. 7 is a diagram schematically showing the configuration of the compressor unit according to the variation of the first embodiment.

As shown in FIG. 7, the adjustment means 31 may include a valve 31*d* provided on the first routing section 29*a* and having an adjustable opening, and a throttle part 31*e* provided on the second routing section 29*c*. The throttle part 31*e* suppresses the flow rate of the hydrogen gas flowing through the second routing section 29*c*. Therefore, when the valve 31*d* is fully opened, almost the entire amount of hydrogen gas discharged from the compressor part 12 flows through the first routing section 29*a*. On the other hand, when the valve 31*d* is closed, the entire amount of hydrogen gas discharged from the compressor part 12 flows through the second routing section 29*c*.

In this configuration, the control unit 39*a* performs the same control operation as in FIG. 6. In step ST12 of FIG. 6, the valve 31*d* of the first routing section 29*a* is closed. This stops the flow of the hydrogen gas discharged from the compressor part 12 into the preheater 16. In step ST14, the valve 31*d* is controlled such that the opening of the valve 31*d* increases. As a result, the gas flow rate passing through the preheater 16 increases, and the gas flow rate passing through the throttle part 31*e* decreases. In step ST15, the valve 31*d* is controlled such that the opening of the valve 31*d* decreases. As a result, the gas flow rate passing through the preheater 16 decreases, and the gas flow rate passing through the throttle part 31*e* increases. That is, the flow of the hydrogen gas discharged from the compressor part 12 into the preheater 16 is adjusted such that the suction temperature is within the predetermined temperature range. Note that in the configuration shown in FIG. 7, the control unit 39*a* may perform the same control operation as in FIG. 4.

Second Embodiment

Figure 8:
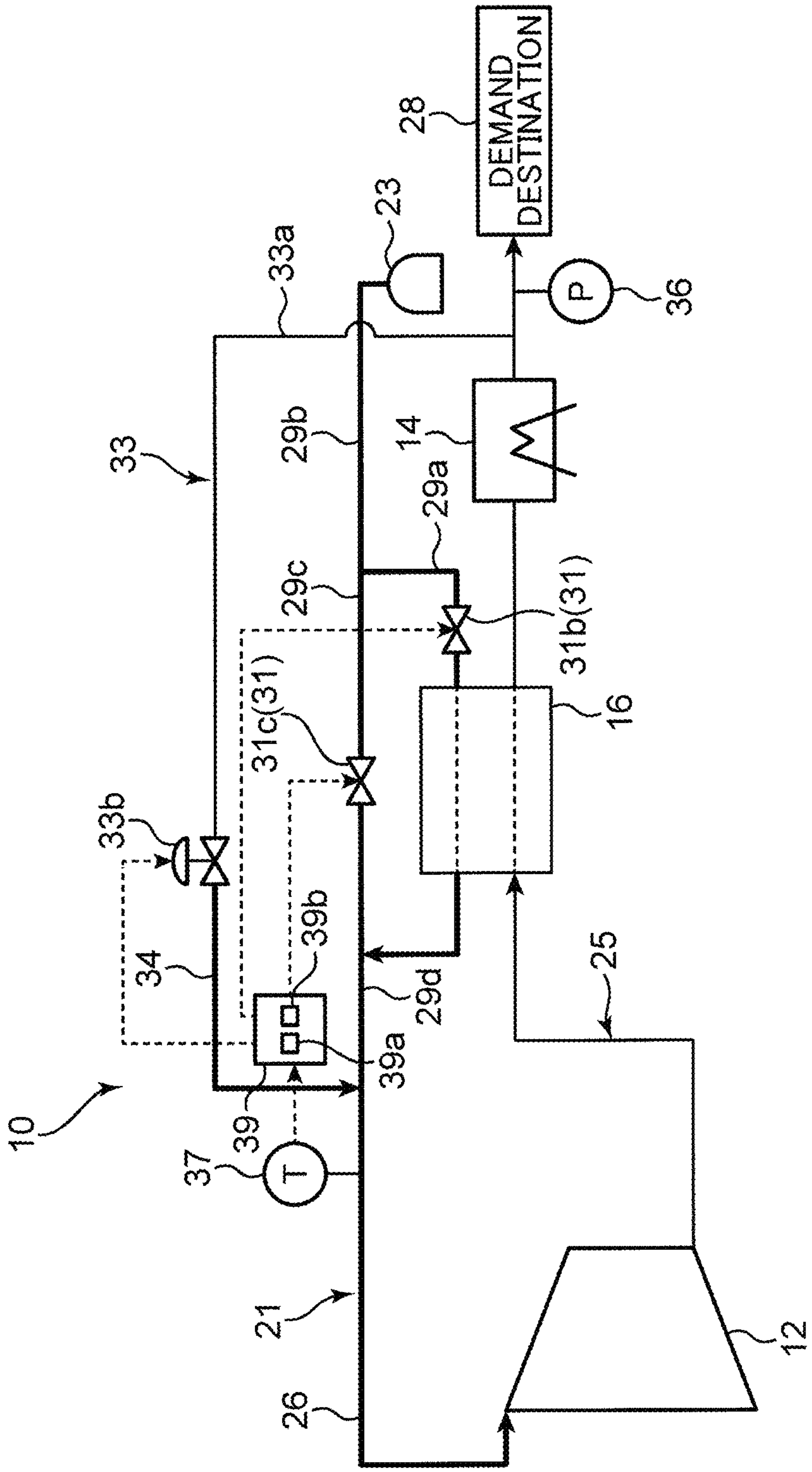
FIG. 8 is a diagram schematically showing a configuration of a compressor unit according to a second embodiment.

FIG. 8 shows a second embodiment of the present invention. Here, the same components as those of the first embodiment are denoted with the same reference numerals, and detailed descriptions thereof will be omitted.

In the first embodiment, the discharge channel 25 includes the first routing section 29*a* and the second routing section 29*c*. In contrast, in the second embodiment, a suction channel 21 includes a first routing section 29*a* and a second routing section 29*c*. That is, the suction channel 21 includes an upstream routing section 29*b*, the first routing section 29*a* and the second routing section 29*c* that split into two branches from the upstream routing section 29*b* and then merge with each other, and a downstream routing section 29*d* through which the hydrogen gas merged from the first routing section 29*a* and the second routing section 29*c* flows.

The upstream routing section 29*b* is connected to a liquid hydrogen storage tank 23. The downstream routing section 29*d* is connected to a compressor part 12. The first routing section 29*a* passes through a preheater 16, whereas the second routing section 29*c* bypasses the preheater 16.

One end of a spillback channel 33*a* is connected to a part downstream of a cooler 14 in a discharge channel 25, whereas the other end is connected to a part downstream of the preheater 16 in the suction channel 21. That is, the other end of the spillback channel 33*a* is connected to the downstream routing section 29*d* of the suction channel 21.

Adjustment means 31 includes a first valve 31*b* provided on the first routing section 29*a* and having an adjustable opening, and a second valve 31*c* provided on the second routing section 29*c* and having an adjustable opening. In this case, in step ST12 of FIG. 6 when a suction temperature (temperature T) is equal to or higher than an upper limit temperature T2, the first valve 31*b* is closed and the second valve 31*c* is fully opened. This prevents the hydrogen gas heading from the liquid hydrogen storage tank 23 to the compressor part 12 from flowing into the preheater 16. Therefore, the hydrogen gas is not heated in the preheater 16 before flowing into the compressor part 12.

In step ST14 of FIG. 6 when the suction temperature (temperature T) is equal to or lower than a target temperature T1, the second valve 31*c* is controlled to decrease the opening of the second valve 31*c*, and the first valve 31*b* is controlled to increase the opening of the first valve 31*b*. As a result, the gas flow rate passing through the preheater 16 increases, whereas the gas flow rate bypassing the preheater 16 decreases. In step ST15 when the suction temperature (temperature T) is higher than the target temperature T1, the second valve 31*c* is controlled to increase the opening of the second valve 31*c*, and the first valve 31*b* is controlled to decrease the opening of the first valve 31*b*. As a result, the gas flow rate passing through the preheater 16 decreases, whereas the gas flow rate bypassing the preheater 16 increases. That is, the flow rate of the hydrogen gas flowing into the preheater 16 is adjusted such that the suction temperature is within the predetermined temperature range.

Note that FIG. 8 shows an example in which the adjustment means 31 includes the first valve 31*b* and the second valve 31*c*, but the adjustment means 31 may include a three-way valve provided at the branch point of the first routing section 29*a* and the second routing section 29*c*. The adjustment means 31 may include a valve disposed in the first routing section 29*a* and a throttle part disposed in the second routing section 29*c*.

Although other configurations, operations, and effects are not described, the description of the first embodiment can be applied to the second embodiment.

Third Embodiment

Figure 9:
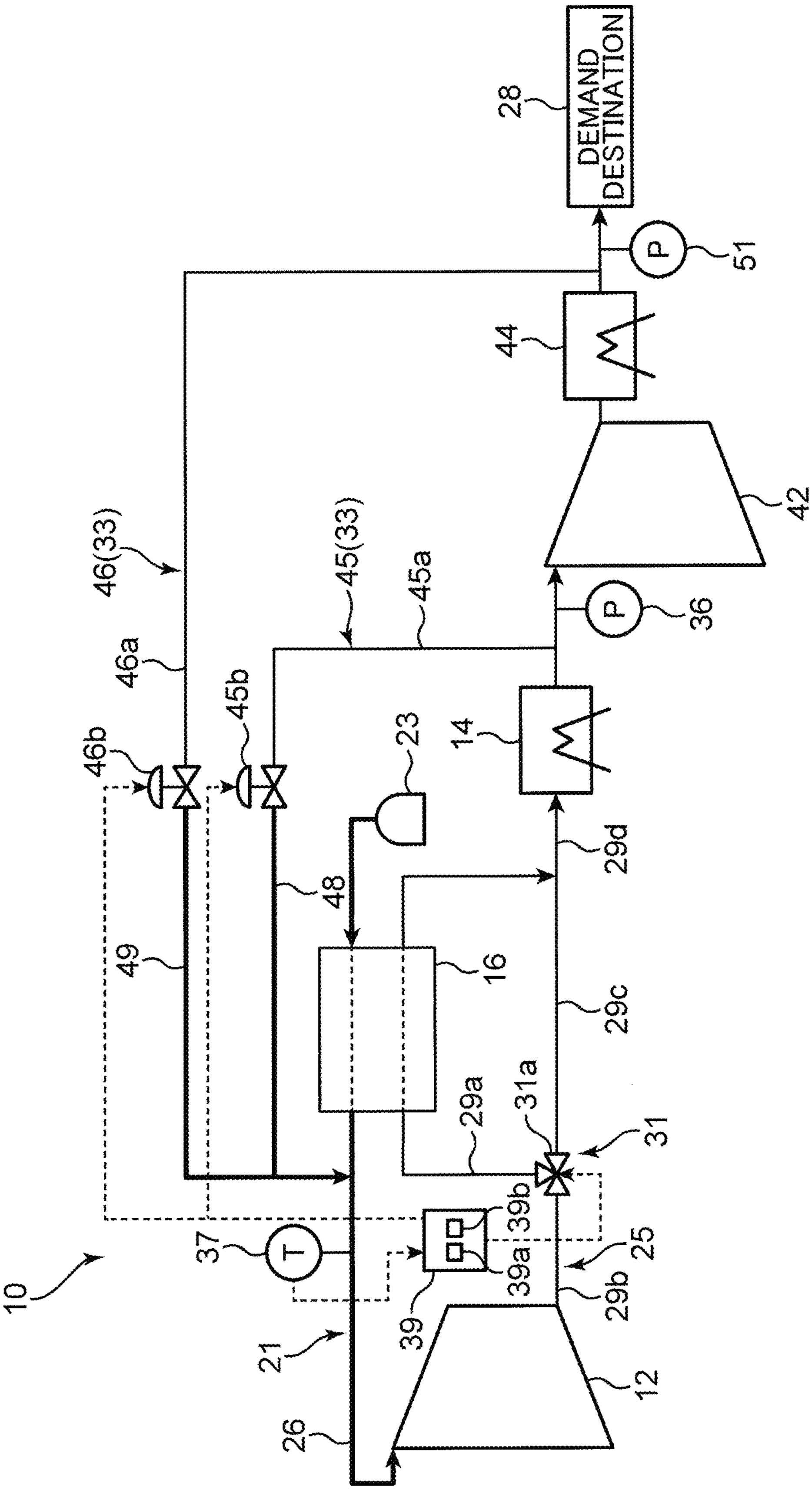
FIG. 9 is a diagram schematically showing a configuration of a compressor unit according to a third embodiment.

FIG. 9 shows a third embodiment of the present invention. Here, the same components as those of the first and second embodiments are denoted with the same reference numerals, and detailed descriptions thereof will be omitted.

The third embodiment further includes a second compressor part 42 that compresses the hydrogen gas after being cooled by the cooler 14, and a second cooler 44 that cools the hydrogen gas compressed by the second compressor part 42.

The cooler 14, the second compressor part 42, and the second cooler 44 are provided on the discharge channel 25. The second compressor part 42 is configured using a reciprocating compressor mechanism. That is, the second compressor part 42 includes a cylinder part, a piston, a piston rod, a pair of suction valves, and a pair of discharge valves, in a similar manner to a compressor part 12. Note that for convenience, FIG. 9 shows the second compressor part 42 as a single trapezoid, but the second compressor part 42 does not necessarily have to be a single stage compressor, but may include multiple compression stages.

The second compressor part 42 is driven by a crank mechanism common to the compressor part 12. In other words, the second compressor part 42 together with the compressor part 12 constitutes a single multi-stage reciprocating compressor. Note that the second compressor part 42 may be configured as a reciprocating compressor independent of the compressor part 12.

The cooler 14 functions as an intercooler that cools the hydrogen gas suctioned into the second compressor part 42, and the second cooler 44 functions as an aftercooler that cools the hydrogen gas discharged from the second compressor part 42. The second cooler 44 may be of a water-cooled type or an air-cooled type, in a similar manner to the cooler 14. The hydrogen gas cooled by the second cooler 44 is sent to a demand destination 28.

A spillback unit 33 includes a first spillback unit 45 and a second spillback unit 46. Note that the spillback unit 33 may include only the second spillback unit 46. That is, the first spillback unit 45, which is an interstage spillback unit, can be omitted.

The first spillback unit 45 includes a first spillback channel 45*a* and a first spillback valve 45*b* including a valve disposed on the first spillback channel 45*a* and having an adjustable opening. One end of the first spillback channel 45*a* is connected to a part between the cooler 14 and the second compressor part 42 in the discharge channel 25, whereas the other end is connected to a part downstream of a preheater 16 in a suction channel 21. The portion downstream of the first spillback valve 45*b* in the first spillback channel 45*a* is provided with a heat insulating material 48 for suppressing heat input from the outside air. However, the heat insulating material 48 can be omitted. Note that the other end of the first spillback channel 45*a* may be connected to a part upstream of the preheater 16 in the suction channel 21.

The second spillback unit 46 includes a second spillback channel 46*a* and a second spillback valve 46*b* including a valve disposed on the second spillback channel 46*a* and having an adjustable opening. One end of the second spillback channel 46*a* is connected to a part downstream of the second cooler 44 in the discharge channel 25, whereas the other end is connected to a part downstream of the preheater 16 in the suction channel 21. The portion downstream of the second spillback valve 46*b* in the second spillback channel 46*a* is provided with a heat insulating material 49 for suppressing heat input from the outside air. However, the heat insulating material 49 can be omitted. Note that the other end of the second spillback channel 46*a* may be connected to a part upstream of the preheater 16 in the suction channel 21.

The discharge channel 25 is provided with a second pressure sensor 51 for detecting the pressure of the hydrogen gas flowing through the second cooler 44. The second pressure sensor 51 is located downstream of the connection part of the second spillback channel 46*a* in the discharge channel 25.

A spillback control unit 39*b* controls the first spillback valve 45*b* based on the pressure detected by the pressure sensor 36, and controls the second spillback valve 46*b* based on the pressure detected by the second pressure sensor 51.

Note that FIG. 9 shows an example in which adjustment means 31 includes a three-way valve 31*a*. However, as in the case shown in FIG. 5, the adjustment means 31 may include a first valve provided on the first routing section 29*a* and having an adjustable opening, and a second valve provided on the second routing section 29*c* and having an adjustable opening. As in the case shown in FIG. 7, the adjustment means 31 may include a valve provided on the first routing section 29*a* and having an adjustable opening, and a throttle part provided on the second routing section 29*c*.

FIG. 9 shows an example in which the discharge channel 25 includes the first routing section 29*a* and the second routing section 29*c*, but alternatively, similar to the case shown in FIG. 8, the suction channel 21 may include the first routing section 29*a* and the second routing section 29*c*.

Although other configurations, operations, and effects are not described, the description of the first and second embodiments can be applied to the third embodiment.

Fourth Embodiment

Figure 10:
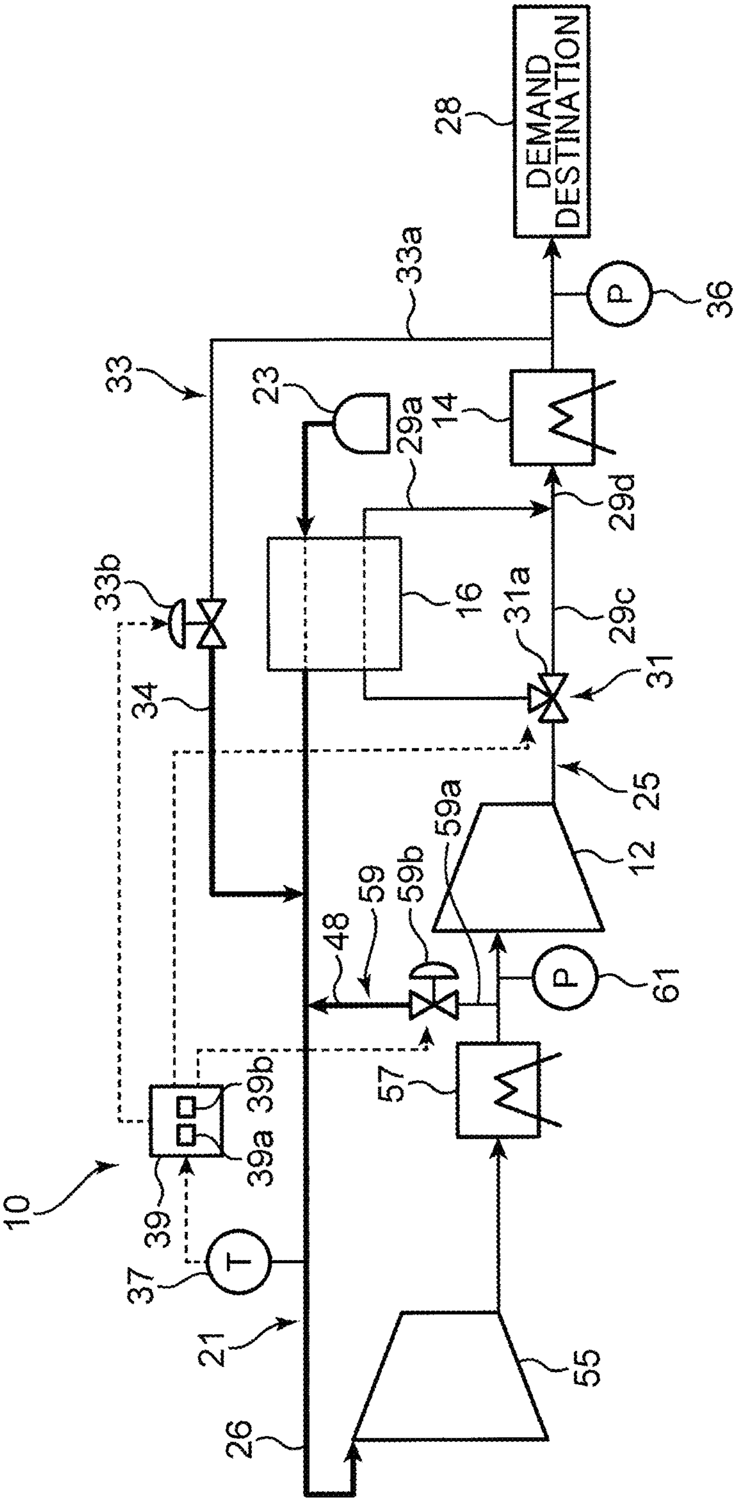
FIG. 10 is a diagram schematically showing a configuration of a compressor unit according to a fourth embodiment.

FIG. 10 shows a fourth embodiment of the present invention. Here, the same components as those of the first and second embodiments are denoted with the same reference numerals, and detailed descriptions thereof will be omitted.

The fourth embodiment further includes a prestage compressor part 55 that compresses the hydrogen gas before being compressed by the compressor part 12, an interstage cooler 57 that cools the hydrogen gas compressed by the prestage compressor part 55, and an interstage spillback unit 59.

The prestage compressor part 55 and the interstage cooler 57 are provided on the suction channel 21. The prestage compressor part 55 is configured using a reciprocating compressor mechanism. That is, the prestage compressor part 55 includes a cylinder part, a piston, a piston rod, a pair of suction valves, and a pair of discharge valves, in a similar manner to the compressor part 12. Note that for convenience, FIG. 10 shows the prestage compressor part 55 as a single trapezoid, but the prestage compressor part 55 does not necessarily have to be a single stage compressor, but may include multiple compression stages.

The prestage compressor part 55 is driven by a crank mechanism common to the compressor part 12. In other words, the prestage compressor part 55 together with the compressor part 12 constitutes a single multi-stage reciprocating compressor. Note that the prestage compressor part 55 may be configured as a reciprocating compressor independent of the compressor part 12.

In the part of the suction channel 21 from the liquid hydrogen storage tank 23 to the prestage compressor part 55, a heat insulating material 26 is provided to suppress heat input from the outside air.

The interstage cooler 57 functions as an intercooler that cools the hydrogen gas before being suctioned into the compressor part 12, and the cooler 14 functions as an aftercooler that cools the hydrogen gas discharged from the compressor part 12. The interstage cooler 57 may be of a water-cooled type or an air-cooled type, in a similar manner to the cooler 14. The hydrogen gas cooled by the cooler 14 is sent to a demand destination 28.

The interstage spillback unit 59 includes an interstage spillback channel 59*a* and an interstage spillback valve 59*b* including a valve disposed on the interstage spillback channel 59*a* and having an adjustable opening. One end of the interstage spillback channel 59*a* is connected to a part between the interstage cooler 57 and the compressor part 12 in the suction channel 21, whereas the other end is connected to a part between the preheater 16 and the prestage compressor part 55 in the suction channel 21. The portion downstream of the interstage spillback valve 59*b* in the interstage spillback channel 59*a* is provided with a heat insulating material 48 for suppressing heat input from the outside air.

The suction channel 21 is provided with an interstage pressure sensor 61 for detecting the pressure of the hydrogen gas that has passed through the interstage cooler 57. The interstage pressure sensor 61 is located downstream of the connection part of the interstage spillback channel 59*a* in the suction channel 21. Therefore, the interstage pressure sensor 61 can detect the pressure of the hydrogen gas suctioned into the compressor part 12.

A spillback control unit 39*b* controls the interstage spillback valve 59*b* based on the pressure detected by the interstage pressure sensor 61, and controls a spillback valve 33*b* based on the pressure detected by the pressure sensor 36.

Although other configurations, operations, and effects are not described, the description of the first to third embodiments can be applied to the fourth embodiment.

Fifth Embodiment

Figure 11:
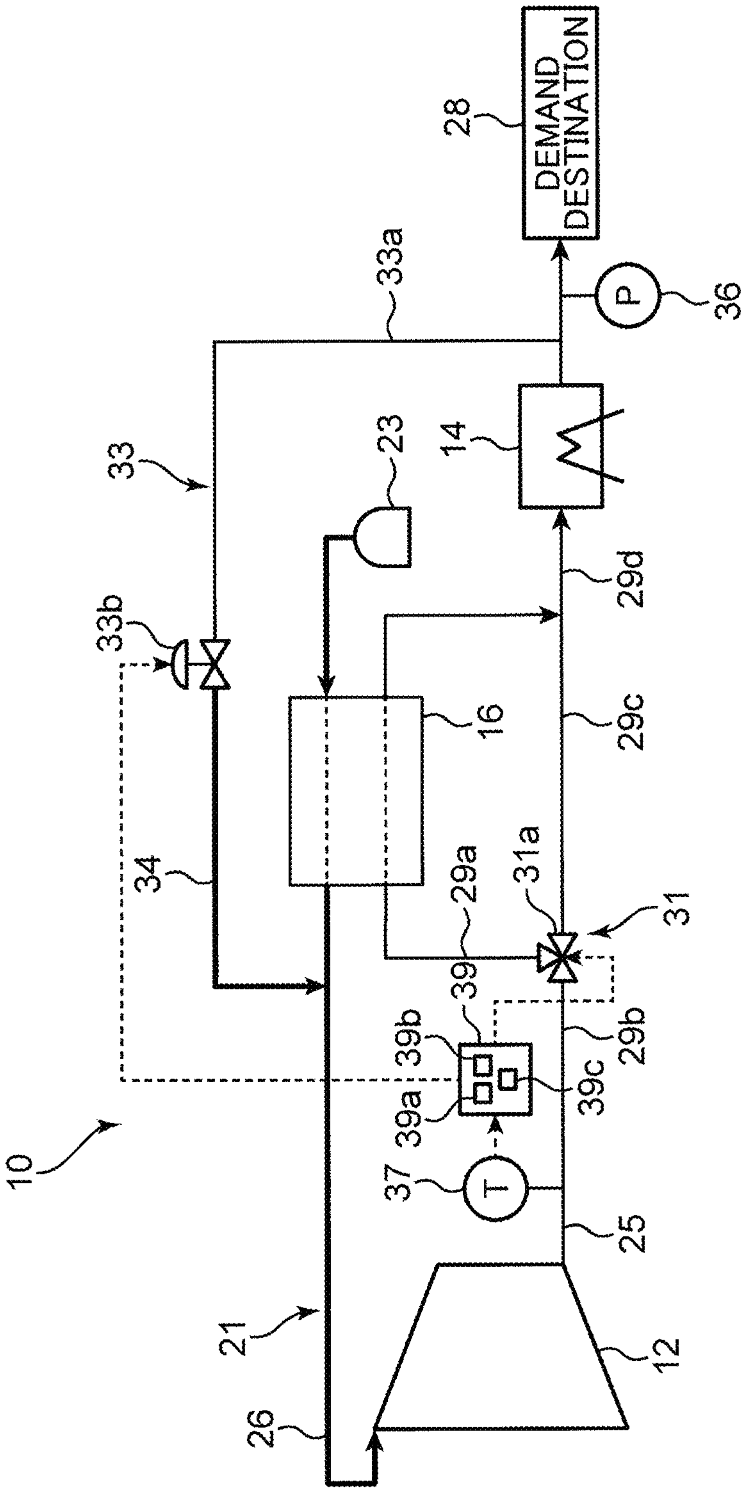
FIG. 11 is a diagram schematically showing a configuration of a compressor unit according to a fifth embodiment.
Figure 12:
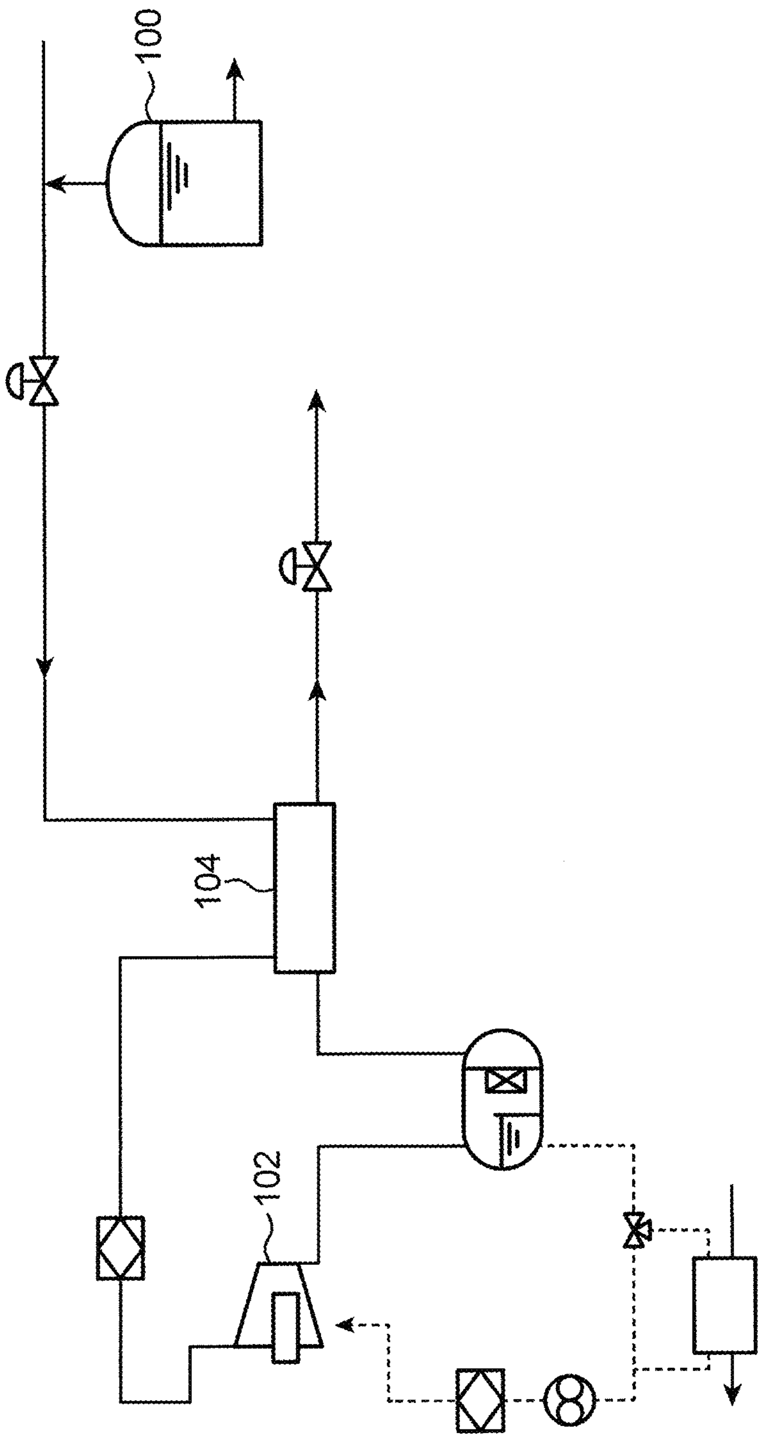
FIG. 12 is a diagram schematically showing a conventional compressor unit.
Figure 13:
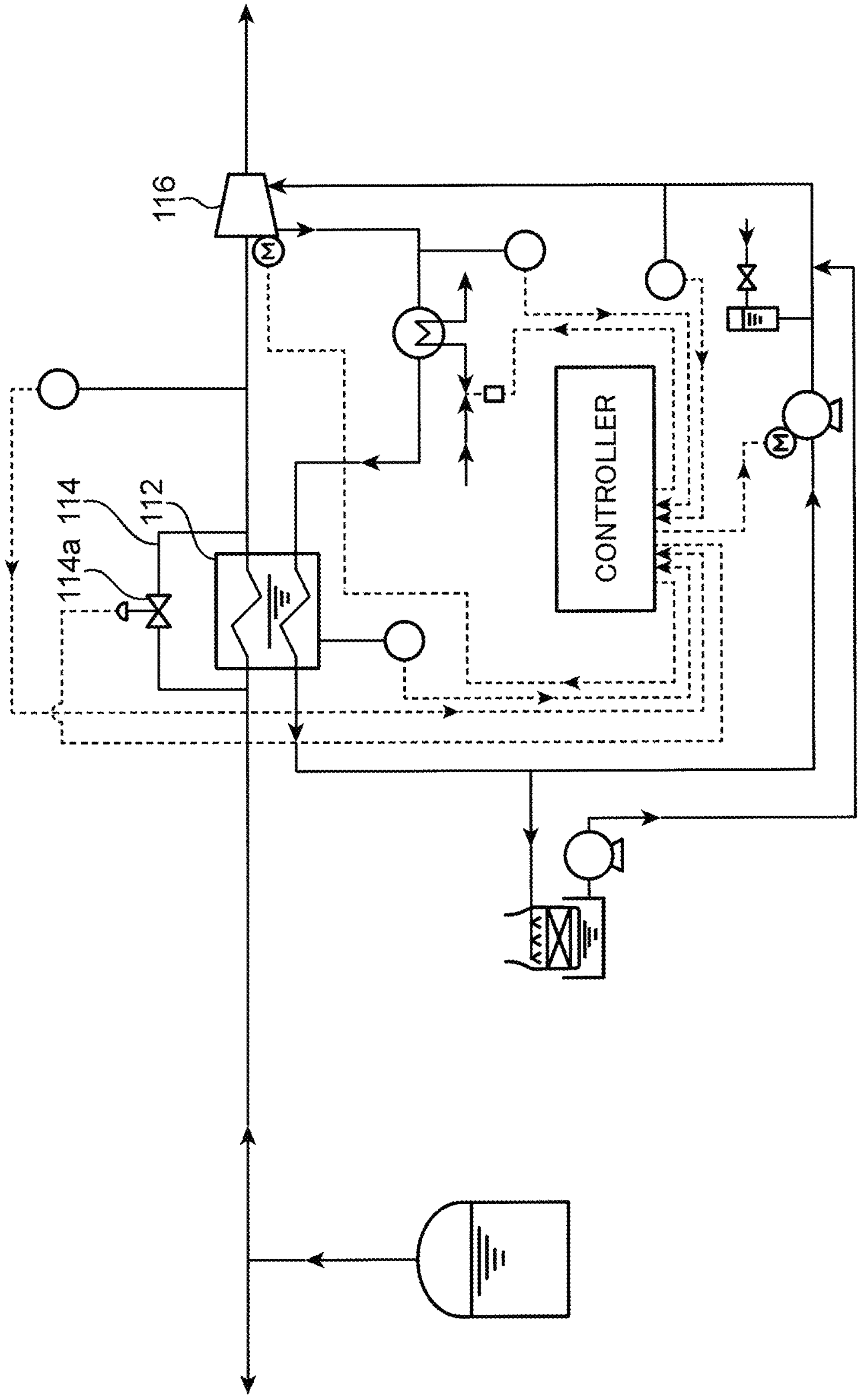
FIG. 13 is a diagram schematically showing the conventional compressor unit.
Figure 14:
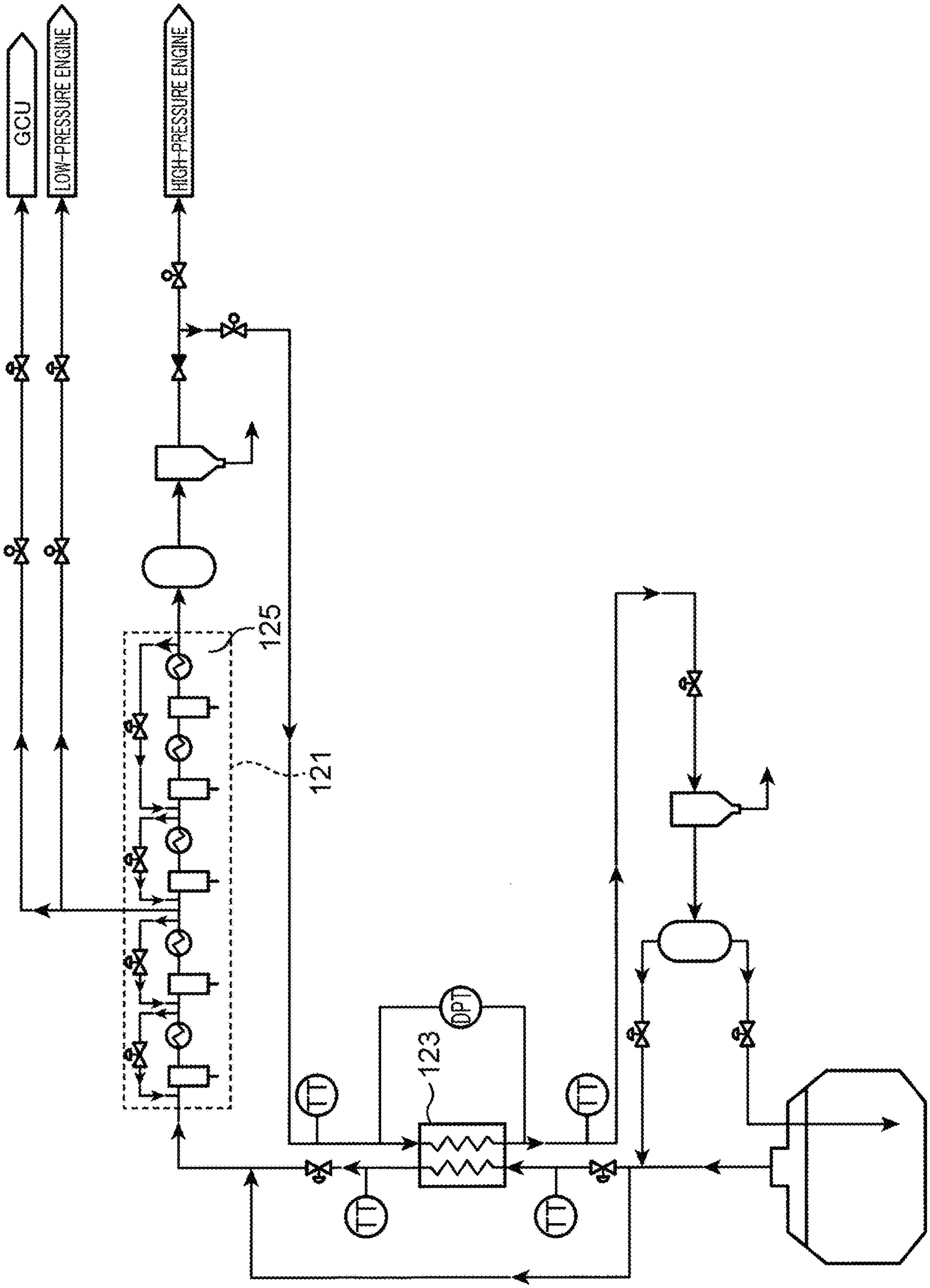
FIG. 14 is a diagram schematically showing the conventional compressor unit.

FIG. 11 shows a fifth embodiment of the present invention. Here, the same components as those of the first to fourth embodiments are denoted with the same reference numerals, and detailed descriptions thereof will be omitted.

In the first embodiment, the temperature sensor 37 is located on the suction channel 21 and detects the suction temperature directly. In contrast, the fifth embodiment is configured such that a temperature sensor 37 is located on the discharge channel 25 and detects the discharge temperature. The temperature sensor 37 is disposed on the upstream routing section 29*b* of the discharge channel 25. That is, the temperature sensor 37 is disposed between the preheater 16 and the compressor part 12 in the discharge channel 25.

Functions of a controller 39 include a calculation unit 39*c* that estimates the suction side temperature of the compressor part 12 based on the discharge temperature acquired by the temperature sensor 37. The calculation unit 39*c* is configured to derive the suction side temperature from the discharge temperature by using the relational expression, map, and the like stored in the controller 39 and associating the discharge temperature with the suction side temperature. The relational expression is, for example, a relational expression assuming that the hydrogen gas is adiabatically compressed in the compressor part 12, and may be a relational expression that defines the relationship between the suction pressure, the suction side temperature, the discharge pressure, and the discharge temperature. The map is a map of data obtained through preliminary testing and may be a map configured to associate the suction temperature with the discharge temperature. The control unit 39*a* controls adjustment means 31 while referring to the suction side temperature estimated by the calculation unit 39*c* as the suction temperature, which is the temperature of the hydrogen gas suctioned into the compressor part 12.

In the flow shown in FIG. 4, before step ST13 is executed, the suction temperature is estimated by the calculation unit 39*c* based on the discharge temperature. In step ST13, the suction temperature (temperature T) estimated by the calculation unit 39*c* is used. The control flow other than this is the same as the flow in FIG. 4.

Therefore, in the present embodiment, the adjustment means 31 adjusts the flow rate of the hydrogen gas passing through the preheater 16, and also adjusts the flow rate of the hydrogen gas that does not pass through the preheater 16. Furthermore, the adjustment means 31 is controlled such that the temperature of the hydrogen gas suctioned into the compressor part 12 falls within the predetermined temperature range. Therefore, the suction temperature of the compressor part 12 can be appropriately managed. In addition, by using the heat of the hydrogen gas before flowing into the cooler 14 (discharge gas), the suction temperature can be appropriately heated.

Note that FIG. 11 shows an example in which the adjustment means 31 includes a three-way valve 31*a*. However, as in the case shown in FIG. 5, the adjustment means 31 may include a first valve 31*b* provided on the first routing section 29*a* and having an adjustable opening, and a second valve 31*c* provided on the second routing section 29*c* and having an adjustable opening. As in the case shown in FIG. 7, the adjustment means 31 may include a valve 31*d* provided on the first routing section 29*a* and having an adjustable opening, and a throttle part 31*e* provided on the second routing section 29*c*.

FIG. 11 shows an example in which the discharge channel 25 includes the first routing section 29*a* and the second routing section 29*c*, but alternatively, as in the case shown in FIG. 8, the suction channel 21 may include the first routing section 29*a* and the second routing section 29*c*. In addition, a second compressor part and a second cooler may be further provided, as in the case shown in FIG. 9. In this case, a spillback unit 33 may include a first spillback unit and a second spillback unit. As in the configuration shown in FIG. 10, the configuration including a prestage compressor part 55, an interstage cooler 57, and an interstage spillback unit 59 may be used. In addition, in the configuration of FIG. 11, the control operation shown in FIG. 6 may be performed.

Although other configurations, operations, and effects are not described, the description of the first to fourth embodiments can be applied to the fifth embodiment.

It should be understood that the embodiments disclosed herein are illustrative in all respects and are not restrictive. The scope of the present invention is indicated by the scope of claims instead of the above description, and is intended to include meanings equivalent to the scope of claims and all modifications within the scope.

In the compressor unit 10 shown in FIG. 1, the spillback valve 33*b* may be controlled based on the detection value of the pressure sensor installed on the suction channel 21. The spillback valve 33*b* may be controlled based on both the pressure sensor 36 and the pressure sensor provided on the suction channel 21. Furthermore, the spillback valve 33*b* may be controlled based on the flow rate sensor (disposed where the pressure sensor 36 is disposed) instead of the pressure sensor 36. The same applies to the spillback valve in other embodiments.

Here, the above embodiments will be outlined.

(1) A compressor unit according to the above embodiments is a compressor unit for recovering a hydrogen gas that is a boil-off gas from a liquid hydrogen storage tank, and supplying at least part of the hydrogen gas to a demand destination including at least one of an engine, a power generation facility, or a boiler. The compressor unit includes: a compressor part including a reciprocating compressor mechanism configured to compress the hydrogen gas flowing through a suction channel and discharge the compressed hydrogen gas into a discharge channel; a water-cooled or air-cooled cooler for cooling the hydrogen gas discharged into the discharge channel; a preheater configured to exchange heat between the hydrogen gas before being suctioned into the compressor part, and the hydrogen gas after being discharged from the compressor part and flowing toward the cooler; and a spillback unit including a spillback channel for returning the hydrogen gas discharged from the compressor part to a part downstream or upstream of the preheater in the suction channel. The discharge channel or the suction channel includes a first routing section and a second routing section that split into two branches along a flow direction of the hydrogen gas and then merge with each other. The first routing section passes through the preheater while the second routing section does not pass through the preheater. The compressor unit further includes: adjustment means configured to adjust a flow rate of the hydrogen gas flowing through the first routing section and adjust a flow rate of the hydrogen gas flowing through the second routing section; and a control unit configured to control the adjustment means such that a suction temperature that is a temperature of the hydrogen gas suctioned into the compressor part falls within a predetermined temperature range. The predetermined temperature range is higher than a reference temperature based on a liquefaction temperature of air.

In this compressor unit, the adjustment means adjusts the flow rate of the hydrogen gas passing through the preheater and the flow rate of the hydrogen gas that does not pass through the preheater. Furthermore, the adjustment means is controlled such that the temperature of the hydrogen gas suctioned into the compressor part falls within the predetermined temperature range. Therefore, the suction temperature of the compressor part can be appropriately managed. In addition, by using the heat of the hydrogen gas before flowing into the cooler (discharge gas), the suction temperature can be appropriately heated. Moreover, since the temperature range of the hydrogen gas suctioned into the compressor part can be made higher than the predetermined reference temperature, liquefaction of oxygen, which is a combustion supporting gas, can be avoided.

(2) The compressor unit may further include a temperature sensor disposed between a connection part of the spillback channel and the compressor part in the suction channel. In this case, the control unit may be configured to refer to the temperature acquired by the temperature sensor as the suction temperature. In this aspect, since the connection part where the spillback channel is connected to the suction channel is located upstream of the temperature sensor, even if the gas temperature detected by the temperature sensor changes due to the hydrogen gas returned to the suction channel by the spillback unit, the temperature of the hydrogen gas suctioned into the compressor part can be kept within an appropriate range.

(3) The compressor unit is configured to recover the hydrogen gas that is a flammable boil-off gas lower than 0° C. from the liquid hydrogen storage tank. The compressor unit may further include: a temperature sensor disposed between the preheater and the compressor part in the discharge channel; and a calculation unit configured to estimate a suction side temperature of the compressor part based on a discharge temperature acquired by the temperature sensor. In this case, the control unit may be configured to refer to the suction side temperature estimated by the calculation unit as the suction temperature.

In this aspect, the adjustment means adjusts the flow rate of the hydrogen gas passing through the preheater and the flow rate of the hydrogen gas that does not pass through the preheater. Furthermore, the adjustment means is controlled such that the temperature of the hydrogen gas suctioned into the compressor part falls within the predetermined temperature range. Therefore, the suction temperature of the compressor part can be appropriately managed. In addition, by using the heat of the hydrogen gas before flowing into the cooler (discharge gas), the suction temperature can be appropriately heated. Moreover, since the temperature range of the hydrogen gas suctioned into the compressor part can be made higher than the predetermined reference temperature, liquefaction of oxygen, which is a combustion supporting gas, can be avoided.

(4) The adjustment means may include a three-way valve provided at a branch point of the first routing section and the second routing section. In this aspect, one valve can adjust the flow rate of the hydrogen gas toward the preheater and the flow rate of the hydrogen gas that does not pass through the preheater, contributing to simplifying the configuration.

(5) The adjustment means may include a valve provided on the first routing section and having an adjustable opening, and a valve provided on the second routing section and having an adjustable opening.

(6) The adjustment means may include a valve provided on the first routing section and having an adjustable opening, and a throttle part provided on the second routing section to suppress the flow rate of the hydrogen gas.

(7) The control unit may be configured to control the adjustment means to stop flow of the hydrogen gas in the first routing section when the suction temperature is equal to or higher than a predetermined upper limit temperature, and control the adjustment means such that the suction temperature is within the predetermined temperature range when the suction temperature is lower than the upper limit temperature. In this aspect, the flow of the hydrogen gas in the preheater is stopped when the suction temperature is equal to or higher than the predetermined upper limit temperature, preventing the temperature of the hydrogen gas suctioned into the compressor part from becoming too high.

(8) The suction channel may include a heat insulating material for suppressing heat input from the outside air. In this aspect, it is possible to more appropriately control the suction temperature by suppressing unintended heat input in the suction channel.

As described above, it is possible to appropriately manage the temperature of the hydrogen gas that is a boil-off gas suctioned into the reciprocating compressor part in the compressor unit.

The invention claimed is:

1. A compressor unit for recovering a hydrogen gas that is a boil-off gas from a liquid hydrogen storage tank, and supplying at least part of the hydrogen gas to a demand destination including at least one of an engine, a power generation facility, or a boiler, the compressor unit comprising:

a compressor part including a reciprocating compressor mechanism configured to compress the hydrogen gas flowing through a suction channel and discharge the compressed hydrogen gas into a discharge channel;

a water-cooled or air-cooled cooler for cooling the hydrogen gas discharged into the discharge channel;

a preheater configured to exchange heat between the hydrogen gas before being suctioned into the compressor part, and the hydrogen gas after being discharged from the compressor part and flowing toward the cooler; and a spillback unit including a spillback channel and a spillback valve, the spillback channel being for returning the hydrogen gas discharged from the compressor part to a part downstream or upstream of the preheater in the suction channel, the spillback valve being disposed in the spillback channel and having an adjustable opening, and a pressure sensor or a flow rate sensor provided on at least one of the suction channel and the discharge channel, wherein the discharge channel or the suction channel includes a first routing section and a second routing section that split into two branches along a flow direction of the hydrogen gas and then merge with each other, the first routing section passes through the preheater while the second routing section does not pass through the preheater, the compressor unit further comprises:

adjuster configured to adjust a flow rate of the hydrogen gas flowing through the first routing section and adjust a flow rate of the hydrogen gas flowing through the second routing section; and a controller configured to control the adjuster such that a suction temperature that is a temperature of the hydrogen gas suctioned into the compressor part falls within a predetermined temperature range, and a spillback control unit configured to adjust the opening of the spillback valve based on a detection value of the pressure sensor or the flow rate sensor, wherein the predetermined temperature range is higher than a reference temperature that is a temperature which prevents liquefaction of oxygen.

2. The compressor unit according to claim 1, further comprising a temperature sensor disposed between a connection part of the spillback channel and the compressor part in the suction channel, wherein the controller is configured to refer to the temperature acquired by the temperature sensor as the suction temperature.

3. The compressor unit according to claim 1, wherein the compressor unit is configured to recover the hydrogen gas that is a flammable boil-off gas lower than 0° C. from the liquid hydrogen storage tank, and further comprises:

a temperature sensor disposed between the preheater and the compressor part in the discharge channel; and a calculator configured to estimate a suction side temperature of the compressor part based on a discharge temperature acquired by the temperature sensor, and the controller is configured to refer to the suction side temperature estimated by the calculator as the suction temperature.

4. The compressor unit according to claim 1, wherein the adjuster includes a three-way valve provided at a branch point of the first routing section and the second routing section.

5. The compressor unit according to claim 1, wherein the adjuster includes a valve provided on the first routing section and having an adjustable opening, and a valve provided on the second routing section and having an adjustable opening.

6. The compressor unit according to claim 1, wherein the adjuster includes a valve provided on the first routing section and having an adjustable opening, and a throttle part provided on the second routing section to suppress the flow rate of the hydrogen gas.

7. The compressor unit according to claim 1, wherein the controller is configured to control the adjuster to stop flow of the hydrogen gas in the first routing section when the suction temperature is equal to or higher than a predetermined upper limit temperature, and control the adjuster such that the suction temperature is within the predetermined temperature range when the suction temperature is lower than the upper limit temperature.

8. The compressor unit according to claim 1, wherein the suction channel includes a heat insulating material to suppress heat input from outside air.

* * * * *